R. JOHNSON.
MOLD.
APPLICATION FILED NOV. 26, 1910.

994,643.

Patented June 6, 1911.

2 SHEETS—SHEET 1.

Witnesses
A. J. Matter
Richard Hayes

Inventor
Reinhold Johnson
By J. F. Mock
Attorney

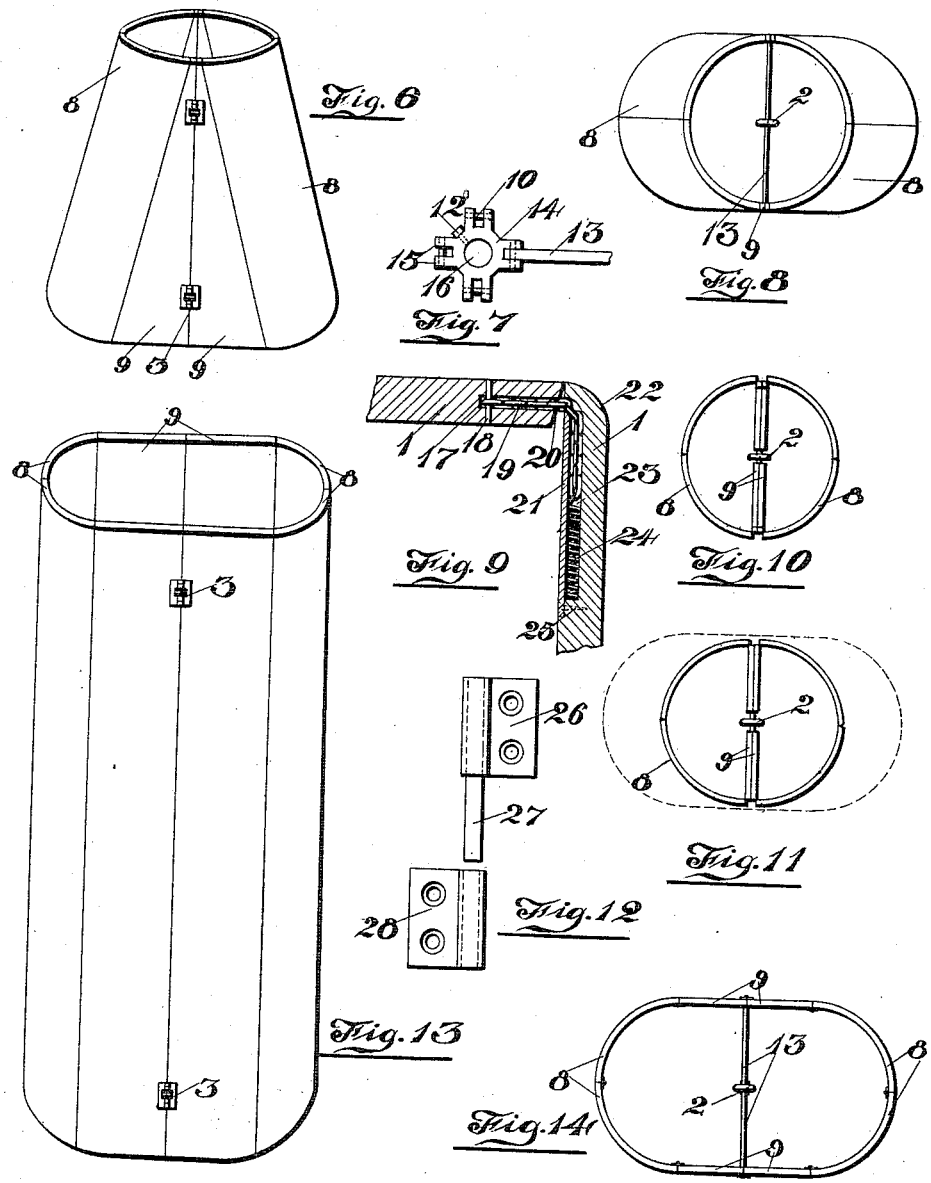

UNITED STATES PATENT OFFICE.

REINHOLD JOHNSON, OF PORTLAND, OREGON.

MOLD.

994,643.

Specification of Letters Patent.

Patented June 6, 1911.

Application filed November 26, 1910. Serial No. 594,262.

*To all whom it may concern:*

Be it known that I, REINHOLD JOHNSON, (who has declared his intention to become a citizen of the United States,) residing at Portland, in the county of Multnomah and State of Oregon, have invented certain new and useful Improvements in Molds, of which the following is a specification.

This invention relates to improvements in forms or molds for molding concrete and other plastic material, and has for its object to provide a mold having mechanism for spreading it into erect position, to be used and with which the form may be collapsed and withdrawn from the molded material, when the latter is in condition for the forms to be removed. I accomplish these objects by the mechanism illustrated in the accompanying drawing, in which—

Figure 1:
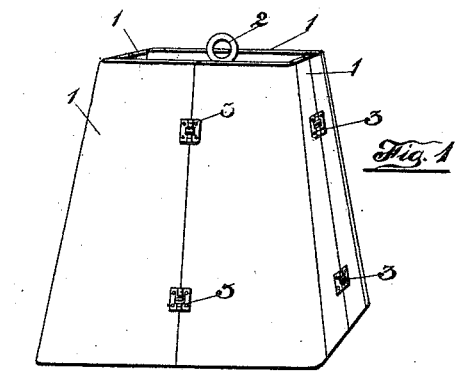
Figure 2:
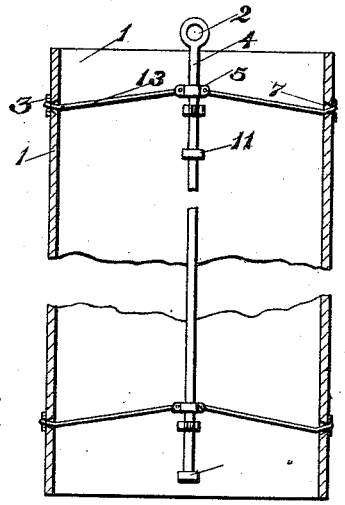
Figure 3:
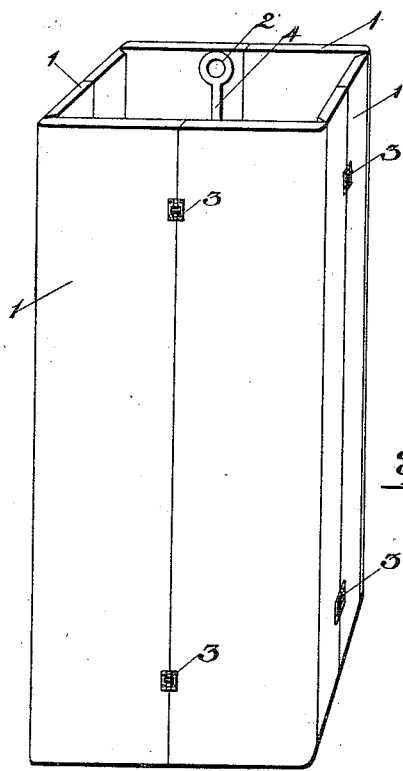
Figure 4:
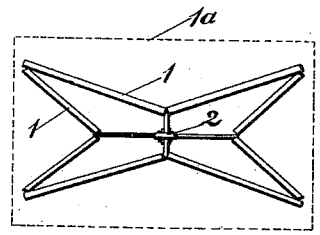
Figure 5:
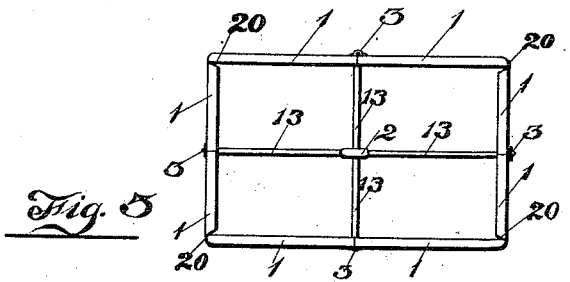

Figure 1, shows my improved mold made with its end members narrowed to the top. Fig. 2, shows the spreading mechanism. Fig. 3, shows a rectangular form of mold in perspective. Fig. 4, is a plan of same collapsed. Fig. 5, is a top plan of Fig. 3. Fig. 6, shows a form which is oblong in cross section and having rounded end members which approach each other at the top, to form a round opening. Fig. 7, is a detail of the connecting mechanism for the spreader. Fig. 8, is a plan view of Fig. 6. Fig. 9, is a detail of a union for securing the members of the mold together at an angle. Fig. 10, shows the form in Fig. 6 collapsed. Fig. 11, is a top plan of an oblong form having rounded end members, collapsed. Fig. 12, shows a form of hinge used in uniting members 9, upon which the links may be pivoted. Fig. 13, is a perspective view of an erect oblong form having rounded end members. Fig. 14, is a plan of same.

Similar reference characters indicate similar parts throughout the several views.

In the drawing 1 indicates the lateral members of the mold, which are arranged in pairs, the members of which pairs being connected to each other, by the external hinges 3. Each pair of these members constitutes one of the lateral units, or sides, of the mold. What may be termed the side and end portions or units are yieldingly connected to each other, by internal hinges or unions, so that they will move freely upon their unions and yet, will be held firmly together, when the mold is erect, forming a corner which is rounded, as at 22.

In Fig. 9 is shown a detail of a union or fastening device, one of which is secured near the top and bottom of each pair of units, so as to form what corresponds to corner hinges. A lateral aperture 17 is formed in a member 1 in which a suitable chain or other flexible element 19, is placed, where it is secured upon the pin 18. To the other end of this flexible element is secured a spring 24, which, with a portion of the chain is inlaid in a groove 23, in the adjacent unit and it is held in place by the plate 21, secured by screws 25, or in any well known manner, and over which the chain moves as the members are opened and closed. One of the members is beveled at 20, to allow them to fold readily together, the spring permitting the members to separate sufficiently for that purpose, when collapsed, and yet it will hold them in place, when spread for use. The mold is held in its erect or working position by a spreader which consists of a central bar 4, to which is secured upper and lower collars 14, provided with the aperture 16 and held on the bar by the set screw 12. At each of the four sides of the collar, is formed the lugs 15, in which is secured the horizontal pivot pin 10, on each of which operates a link 13. As will be seen from Figs. 2, 4 and 5, these toggle links are arranged opposite the hinged edges of each unit of the mold, about the bar 4, their outer ends being pivotally secured upon the pin of the hinges 3, between the wings thereof. The recesses 7 are formed in the members 1 to permit the insertion of said links and allow of their free movement, as the mold is collapsed.

These forms are intended for use in the construction of sewers, chimneys, walls and the like, and may be used singly or in series.

In operation, the form is expanded to working position by pressing downward on the hand hold 2, of the bar 4, as clearly shown in Figs. 1 and 3. The material is placed in position about the form, and after standing a sufficient length of time the latter is removed in the following manner. The bar 4 will be lifted bodily causing each of the links 13 to rise and to draw inward the middle edges of each lateral unit, or pair of members 1, thus collapsing the form to the position shown in Fig. 4, leaving it free to be withdrawn from the molded material, shown at 1ª thereof.

In the event that it is desired to form a mold having a narrow top or opening, the dimensions of the form above described will be altered for that purpose, as shown in Fig. 1. The only difference in operation, being that if the top is much smaller than the bottom portion, it may become necessary to dismember the form, to remove it. This is quickly done after the mold is collapsed, by lifting the members 8, containing the wings 26, of the hinges, thereby withdrawing the pin 27 from the wing 28, thus disengaging the parts. The form in Fig. 1 may be used as a separate mold or it may be used in conjunction with that in Fig. 3, after the latter has been removed, to reduce the size of the opening.

A further modification is shown in Figs. 6 and 13, in which two units or pairs of members, at opposite sides, are made hemi-cylindrical in form, as at 8, and the links which engaged the corresponding members in the rectangular form, are dispensed with. Thus when the spreader is raised, the other two pairs of side members, or units, 9, will fold together, as seen in Figs. 10 and 11. In this form a top mold, producing a small circular opening is formed by reducing the members 9 approximately to a point, at the top. In any case, the members 9 are narrow enough to permit the form to be withdrawn when collapsed. The forms are operated in the same manner as those above described.

The form of collar shown in Fig. 7 is used only when the side members of the mold are equal. If the mold is oblong, the short links will retract their respective sides more rapidly than the others. Therefore it is necessary to have them connected to a collar which can slide along the bar 4 as it is operated, so the short links will not come into operation until the proper time. An adjustable collar or stop 11 is secured by a set screw on the bar at the desired point to bring the shorter links into operation, thereby securing such motion as is necessary in the lateral members of the mold, the fixed collar limiting its movement upwardly.

Having thus described my invention, what I claim as new and desire to secure by Letters Patent, is—

1. A form for molding plastic material comprising oppositely disposed units each of which is composed of two members hinged at their adjacent edges and each unit yieldingly connected to its adjacent unit by a flexible union and a spreader intermediate of said units, pivotally connected to the hinged edges of one pair of members by fixed pivots and to the other by sliding pivots, whereby said edges may be withdrawn and restored.

2. In a form for molding plastic material, side members comprising oppositely disposed units, one unit on two opposite sides being composed of two members hinged at their adjacent edges and connected to their adjacent units by unions consisting of flexible elements secured by one end to the edge of one unit and by the other to springs in the edge of the adjacent unit, and means within for reciprocating the said hinged edges.

3. In a form for molding plastic material, side members comprising oppositely disposed pairs, hinged at their adjacent edges, each pair being united to its adjacent pair by a yielding flexible union the members of which are adapted to fold together inwardly, and a spreader comprising a central bar to which is pivotally secured series of links, each series corresponding in position to the hinged edges of said pairs, to which they are likewise secured, for reciprocating said hinged edges.

4. In a mold for plastic material, the combination of side members having ends of unequal width with a spreader consisting of a central bar provided with a plurality of fixed and movable supports, and a plurality of links each pivotally secured by one end to one of said supports and by the other to said side members.

5. A mold for plastic material comprising oppositely disposed units, each of which is composed of two members hinged at their adjacent edges and each unit hinged to its adjacent unit, a spreader intermediate of said units consisting of a central bar provided with a fixed collar, having links pivotally secured to said collar at opposite sides and to the corresponding units, and a sliding collar on said bar having links pivotally engaging the units intermediate of those connected to said fixed collar, whereby said units may be reciprocated in varying distances.

In testimony whereof I affix my signature in presence of two witnesses.

REINHOLD JOHNSON.

Witnesses:
J. T. ELLIS,
M. REYNOLDS.

Copies of this patent may be obtained for five cents each, by addressing the "Commissioner of Patents, Washington, D. C."